United States Patent
Jullien-Davin

[11] 3,710,155
[45] Jan. 9, 1973

[54] NON-RETURN, DIRECTION OF ROTATION SELECTING DEVICE FOR SYNCHRONOUS MOTOR

[75] Inventor: Jean Jullien-Davin, Valence, France
[73] Assignee: Crouzet, Paris, France
[22] Filed: July 26, 1971
[21] Appl. No.: 166,204

[52] U.S. Cl. ..................................310/41, 310/68
[51] Int. Cl. ...............................................H02k 7/10
[58] Field of Search..........310/41, 162, 163, 169, 68

[56] References Cited

UNITED STATES PATENTS

| | | | |
|---|---|---|---|
| 3,333,125 | 7/1967 | Grabow | 310/41 |
| 3,335,302 | 8/1967 | Van der Linden | 310/41 |
| 3,403,273 | 9/1968 | Higuchi | 310/41 |
| 3,501,656 | 3/1970 | Morley | 310/41 |
| 3,501,657 | 3/1970 | Heinzen et al. | 310/41 |
| 3,501,658 | 3/1970 | Morley | 310/41 |

FOREIGN PATENTS OR APPLICATIONS 527,673  10/1940  Great Britain..........................310/41

*Primary Examiner*—D. F. Duggan
*Attorney*—Holman & Stern

[57] ABSTRACT

A non-return device for a synchronous motor comprising a rotor supported between two brackets and having no preferential rotation direction per se, an eccentric on the rotor axis, an arm mounted on said eccentric through one of its ends and at the other end a contact plug or crank pin and a groove (or port) in a bracket so as to receive said contact plug, this groove comprising thrust bearing means for said contact plug for one direction of rotation of the motor.

4 Claims, 8 Drawing Figures

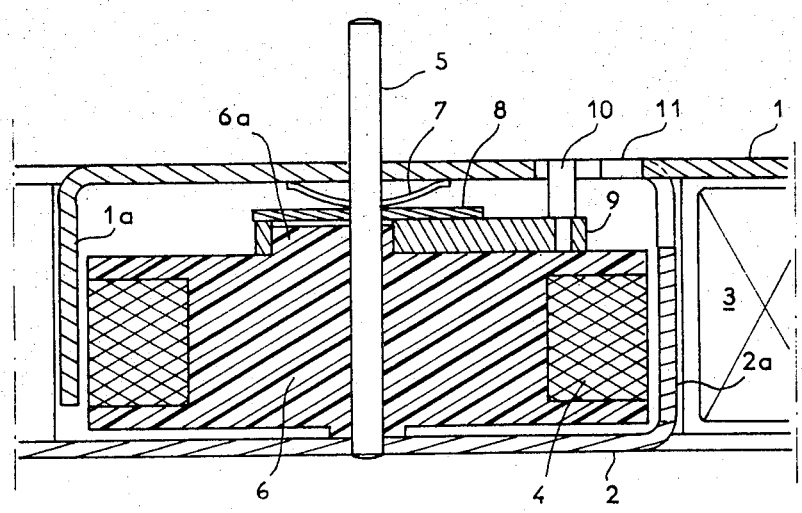
FIG_1
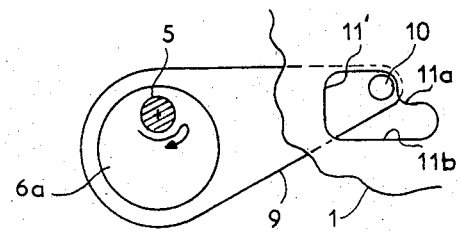
FIG_2
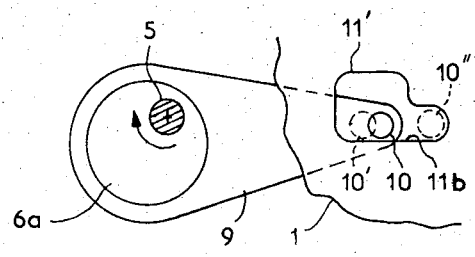
FIG_3

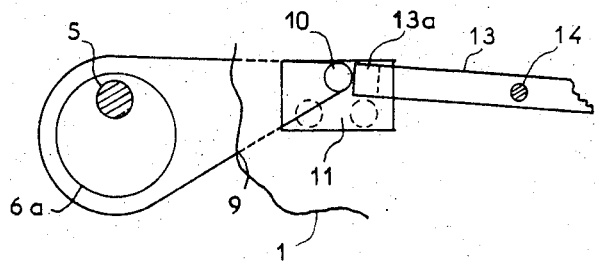
FIG_4
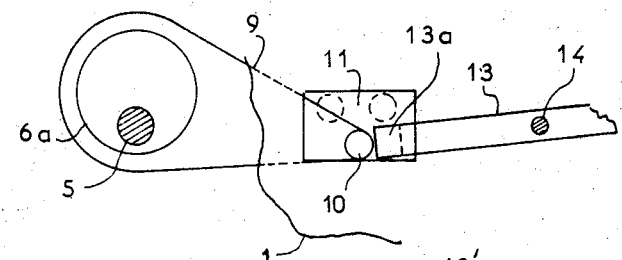
FIG_5
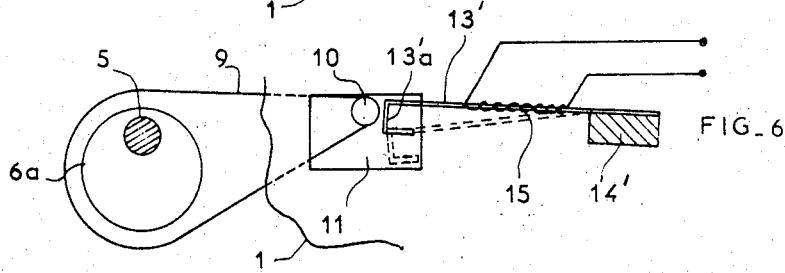
FIG_6
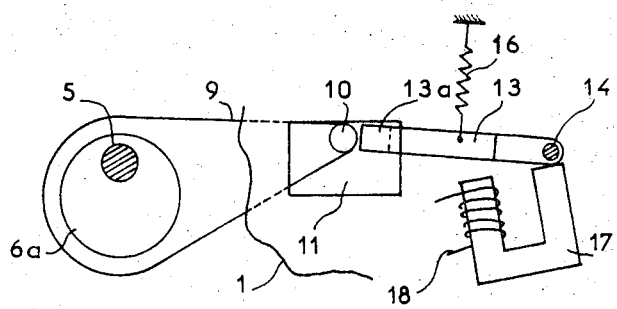
FIG_7
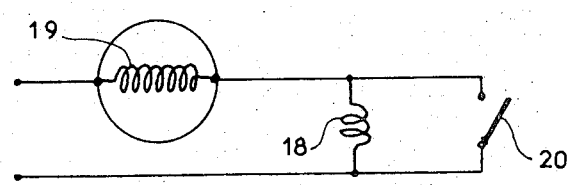
FIG_8 ized in series with the motor and in providing a
NON-RETURN, DIRECTION OF ROTATION SELECTING DEVICE FOR SYNCHRONOUS MOTOR This invention relates to a silent non-return device applicable to small single phase synchronous motors which, in the absence of such a device, may rotate indifferently in one or the other direction. The device according to the invention further relates to a simple way of selecting the direction of rotation by actuating an external control member.

It is known that a large number of synchronous motors do not have any preferential direction of rotation and that it is a constant practice to provide them, upon assembly, with a non-return device; however, in general, in these motors, the direction of rotation is defined once and for all and cannot be changed without dismantling the motor.

Silent non return devices are already known which consist of a ball (or roller) jamming system between a cylindrical member and another member comprising a non concentric slope, one of the members being attached to the frame, and the other being integral with the rotor. Such a device is applied, for example, in French Pat. No. 1,149,195, but its drawback is that the direction cannot be changed without dismantling the motor and, moreover, it is costly, for it requires great manufacturing precision, in particular, a perfect concentricity of the cylindrical member and rotor.

Non-return devices are also known in which a catch-like element prevents rotation in one direction, as is the case, for example, in French Pat. Nos. 1,413,365 and No. 1,391,124. These devices are less costly than the jamming devices, but while they may be simpler, they have the disadvantage which resides in the fact that the choice of direction (through reversal of the catch) cannot be made without dismantling and especially in the fact that the catch oscillates continuously from one thrust bearing to the other, which makes these devices quite noisy.

Finally, a direction selecting device has already been provided in which, as described in French Pat. No. 1,579,497, a member, mounted with smooth friction on the rotor and provided with an elastic reset device, actuates a contactor-inverser so that, depending on whether the motor is energized through one or the other terminal of the contactor-inverser, the motor rotates in one or the other direction; but this device turns out to be rather costly because of the presence of electric contacts and leads to a rather substantial loss of torque due to the fact that the member mounted with smooth friction on the rotor must transmit, as a pure loss, a sufficient torque to overcome the elastic reset and raise a contact.

A specific object of this invention is to provide a very economic, very simple silent device which eliminates the drawbacks of previously known systems.

To this effect, the invention relates to a non-return device for a synchronous motor comprising a rotor supported between two brackets and having no preferential direction of rotation, per se, an eccentric on the rotor axis, an arm mounted on said eccentric through one of its ends and, at the other end, a contact plug or crank pin and a groove (or port) in a bracket so as to receive said contact plug, this groove comprising thrust bearing means for said contact plug, for one direction of rotation of the motor. In one embodiment, the groove is shaped substantially as an L, one branch of which, directed essentially radially and in the direction of the motor axis, is sufficiently long to provide clearance of the contact plug without the latter striking one end or the other of its stroke, and the other branch of which is directed cross-wise.

When the motor starts in the direction for which it has been built, the arm, through its natural friction on the eccentric tends to rotate in the direction in which the contact plug of the arm abuts on the edge of the radial branch of the groove, opposite the cross-wise branch, and it slides freely against this edge.

On the other hand, when the motor starts in the incorrect direction, the contact plug slides on the edge of the radial groove which is interrupted by the cross-wise branch and, as it penetrates in the cross-wise branch, it blocks the rotor which, then, can start again only in the correct direction.

The silent non-return device according to the invention can also be used to provide a particularly simple rotation direction selector; the contact plug enters into a wide rectangular groove arranged radially on the fixed bracket of the motor. The length of the groove is sufficient to provide clearance of the contact plug so that it does not strike the one or the other end of its stroke and the width is slightly greater than twice the diameter of the contact plug. A member which may occupy two positions creates an obstacle to the clearance of the contact plug along one or the other of the radial edges of the groove; it is clear that the motor can rotate only in the direction for which natural friction of the arm on the eccentric maintains the contact plug, against the radial edge of the groove, free of any obstacle.

The movable member, which may occupy two positions, can be a pivoting tipping device controlled manually or through a cam, a movable magnetic armature controlled by an electromagnet or a thermal switch heated by an electric resistor.

When using an electromagnet control, advantageous economic solution consists in energizing said electromagnet in series with the motor and in providing a contact which, when it is closed, shunts the terminals of the coil which is then not in use and which, when it is opened, leaves the coil in use; this arrangement makes it possible to provide the coil with very few turns and a low impedance, i.e., with the minimum weight of copper.

The invention will be more fully understood as a result of the following detailed description with reference to the appended drawing which is given as a non limiting example in which:

FIG. 1 is a partial sectional view of a motor along the rotor axis;

FIG. 2 is a partially broken away top view of the motor shown in FIG. 1;

FIG. 3 is similar to FIG. 2, but for the opposite direction of rotation of the motor;

FIG. 4 is similar to FIG. 2, but for a varying embodiment;

FIG. 5 is identical with FIG. 4, but for another position of the mechanism;

FIGS. 6 and 7 are identical with FIG. 3 but for other varying embodiments;

FIG. 8 is a wiring diagram relating to the varying embodiment of FIG. 7.

FIG. 1 is a sectional view of a synchronous motor comprising, in a known manner, two brackets 1 and 2 made of magnetic material, from which poles 1a and 2a are obtained, which are arranged on a cylindrical surface. A coil 3 is located outside this cylindrical surface and a rotor made of ferrite 4, attached to an axis 5 through a plastic filler core 6 is mounted inside this cylindrical surface. A slight spring 7 and an intermediate washer 8 eliminates the axial backlash of the noise generating rotor. Axis 5 is guided in bores in brackets 1 and 2. According to the invention, the synchronous motor comprises an eccentric 6a integrally molded with core 6, an arm 9 mounted freely on this eccentric and a cylindrical contact plug 10 or crank pin mounted at the end of arm 9 and entering into a groove 11 (or port) arranged radially in bracket 1. As the motor rotates, natural friction between arm 9 and eccentric 6a causes the arm to have a tendency to rotate and causes contact plug 10 to be amaintained in contact with one of the edges of the groove or port 11. The fact that arm 9 is slightly thicker than eccentric 6a and that washer 8 bears elastically on arm 9, enhances natural friction between rotor 6 and the arm, but the device can operate without this increase in friction.

FIGS. 2 and 3 are top views of the motor shown in FIG. 1, in which, for purposes of clarity, only eccentric 6a, axis 5, arm 9 with its contact plug 10 and a part of bracket 1, comprising groove (or port) 11 have been left, thus providing a good understanding of the operation. It can be seen that the radially directed groove or port 11 comprises a cross-wise branch 11'. In FIG. 2, it has been assumed that the motor started in the counter-clockwise direction, arm 9 having a tendency to rotate with rotor 6 and eccentric 6a; contact plug 10 came into branch 11' of the groove in which it has no room for clearance and as it bears on projection 11a, the motor is blocked and can start again only in the other direction. On the other hand, FIG. 3 shows what happens when the motor starts in the clockwise direction — contact plug 10 comes against edge 11b of groove (or port) 11 and oscillates freely between its two extreme positions 10'—10'', shown as a dotted line.

FIGS. 4 and 5 show how the device can be fitted up as a selector of the direction of rotation (components already denoted in FIGS. 1-2-3 have the same reference numbers). The groove or port 11 is, in this case, rectangular and radially directed and its width is substantially equal to twice the diameter of contact plug 10. A movable member or tipping device 13 pivoting on an axis 14 integral with bracket 1 is provided with a bent end 13a entering into port 11. If the bent part 13a occupies the upper corner of groove or port 11 (FIG. 4), the motor can turn only in the clockwise direction.

On the other hand, if part 13a occupies the lower corner of groove 11 (FIG. 5), the motor can rotate only in the counter-clockwise direction.

FIG. 6 shows an embodiment in which the movable member is a thermal switch 13' attached to a support 14', itself integral with bracket 1. Depending on whether a heating electric resistor 15 is energized or not, part 13'a of the thermal switch entering into port 11 is in the position shown as a solid line or in the position shown as a dotted line and the motor rotates in the one or the other direction.

FIG. 7 shows how the movable member 13 can be elastically controlled in one direction by a spring 16, and in the other, by an electromagnet 17 when coil 18 is energized.

Finally, FIG. 8 shows how the coil of electromagnet 18 can be connected in series with winding 19 of the motor and how its terminals can be short-circuited by closing a contact 20 so as to switch off said coil 18. This solution makes it possible to use a very cheap coil 18 with a very low impedance, using very little copper wire.

What I claim is:

1. A non-return device for a synchronous motor comprising a rotor supported between two brackets and having no preferential rotational direction per se, an eccentric on the rotor axis, an arm mounted on said eccentric through one of its ends, a contact plug or crank pin disposed at the other end thereof, a groove or port disposed in a bracket so as to receive said contact plug, said groove comprising thrust bearing means for said contact plug for one direction of rotation of the motor, said groove or port being rectangularly shaped and being radially oriented in the bracket, said device further including a movable member means which may take up two positions so as to occupy one or the other corner of said rectangular groove, said corners being opposite said eccentric with respect to the groove, said movable member means marking off, in the groove, for the arm contact plug, a free space shaped as an L whose cross-wise branch is oriented at will so as to compose one rotational direction over another.

2. A non-return device according to claim 1, wherein the two-position movable member means is a thermal switch heated by an electric resistor.

3. A non-return device according to claim 1, wherein the two-position movable member means is the movable armature of an elastic reset electromagnet.

4. A non-return device according to claim 3, comprising a low impedance electromagnet coil having very little copper wire, energized in series with the electric motor winding and a contact providing for the short-circuiting of the coil terminals.

* * * * *

UNITED STATES PATENT OFFICE
CERTIFICATE OF CORRECTION

Patent No. 3,710,155    Dated January 9, 1973

Inventor(s) Jean Jullien-Davin

It is certified that error appears in the above-identified patent and that said Letters Patent are hereby corrected as shown below:

[30] Foreign Application Priority Data

July 31, 1970 French No. 70 28546

Signed and Sealed this

Nineteenth Day of October 1976

[SEAL]

Attest:

RUTH C. MASON
Attesting Officer

C. MARSHALL DANN
Commissioner of Patents and Trademarks